Figure 1:
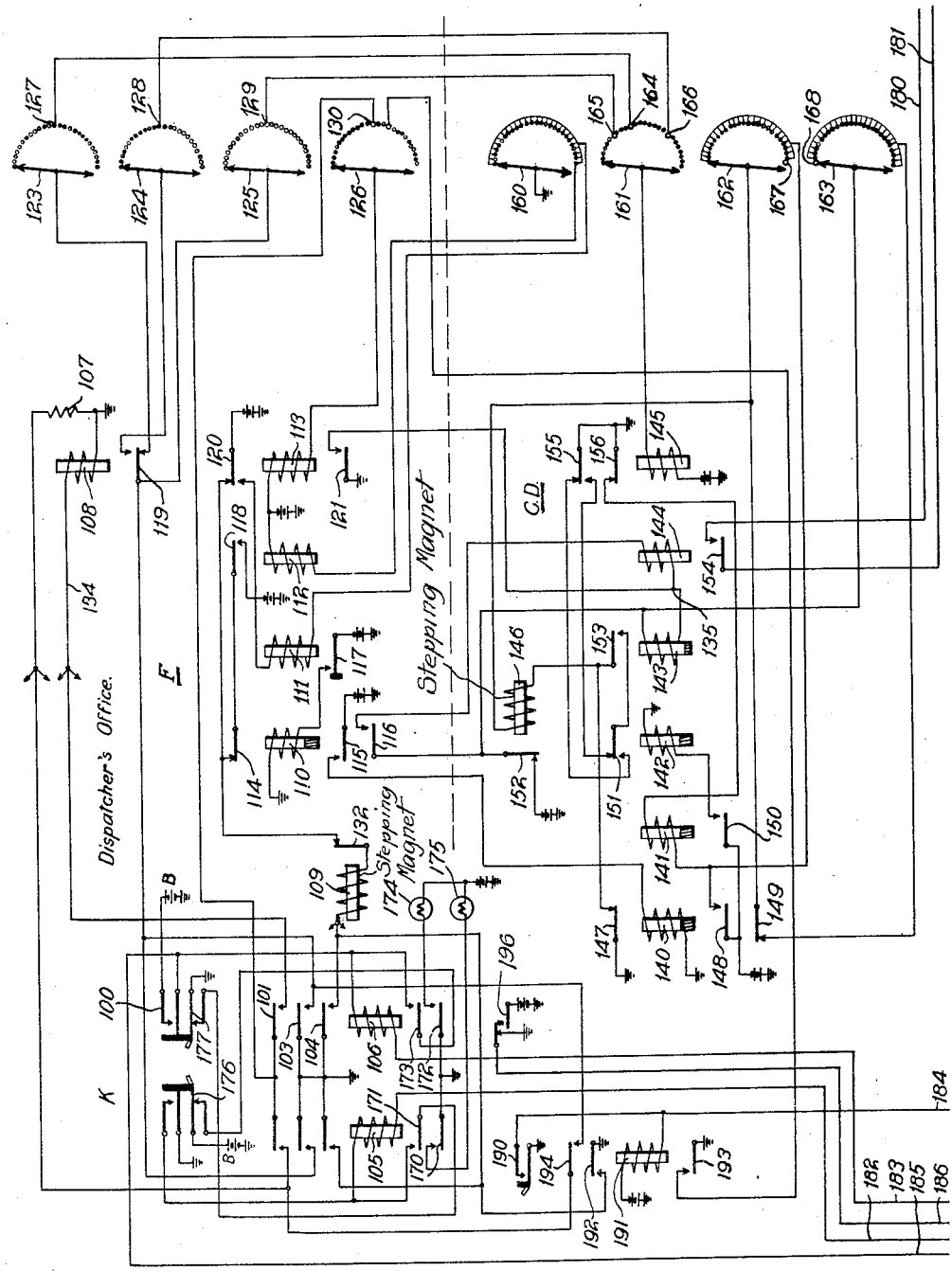

Aug. 20, 1929.  J. E. GARDNER  1,725,134
SUPERVISORY CONTROL SYSTEM
Filed Sept. 20, 1923   7 Sheets-Sheet 2

INVENTOR
John E. Gardner.

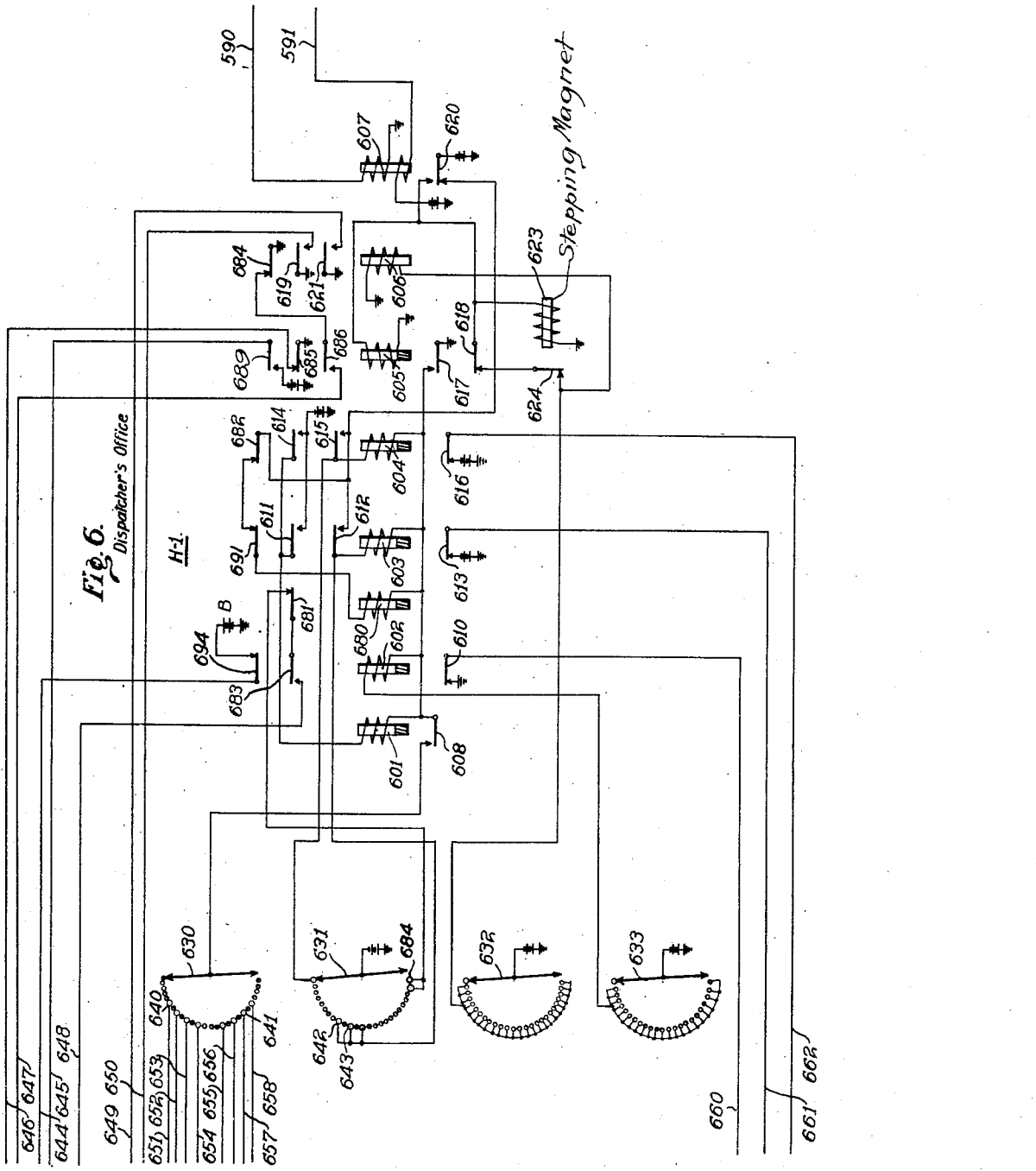

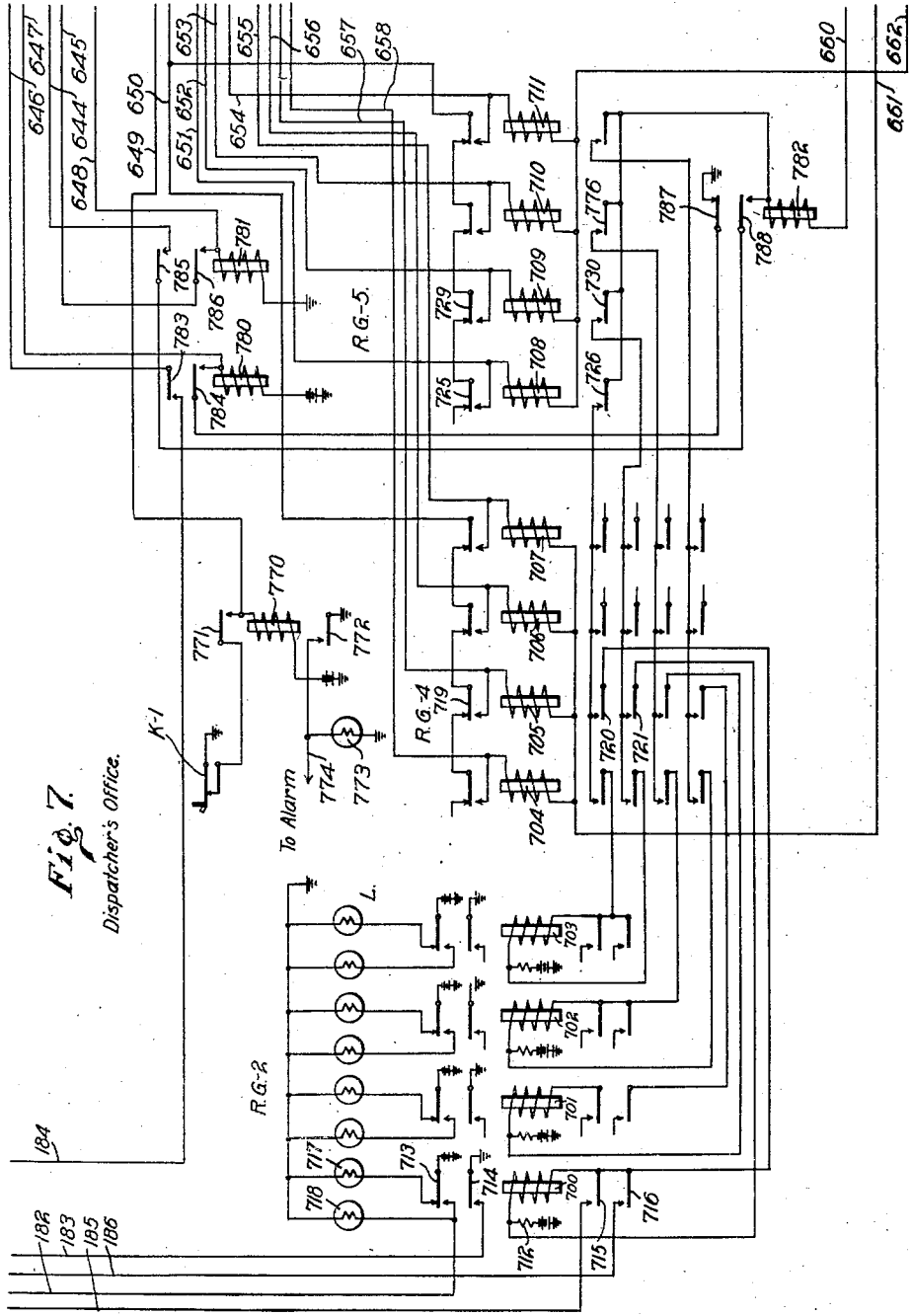

Patented Aug. 20, 1929.

1,725,134

UNITED STATES PATENT OFFICE.

JOHN E. GARDNER, OF WILKINSBURG, PENNSYLVANIA, ASSIGNOR TO WESTINGHOUSE ELECTRIC & MANUFACTURING COMPANY, A CORPORATION OF PENNSYLVANIA.

SUPERVISORY CONTROL SYSTEM.

Application filed September 20, 1923. Serial No. 663,874.

My invention relates, in general, to systems for supervising and controlling electrical equipment from a remote point and more particularly to the supervising and controlling of substations in an electrical system of distribution.

The broad general object of my invention is the provision of novel and efficient circuit arrangements for remotely controlling power units in substations. That is, I have made provisions whereby a load dispatcher located at a central point or control office or station may supervise and control all power or apparatus units in the substations of a complex electrical distributing system. These substations may be of either the manual or the automatic type.

In the present instance, I have shown my invention applied to an electrical system of distribution having automatic substations, though it is by no means limited to this use.

In accordance with my invention, I have provided a group of supervisory lamps and controlling keys for each substation to be used for supervising and controlling the operation of power units therein. There is a trunk line connecting the dispatcher's office to each substation. Associated with each end of each trunk line is a directively controlled automatic switch. Also, in each substation, there is an automatic sending equipment associated with the trunk line. In the dispatcher's office, an automatic impulse sending device is provided which is controlled by the operation of said keys.

In brief, the operation proceeds as follows: When one of the apparatus units at a substation changes its condition, under automatic control, the automatic impulse sender in the substation operates to send a series of impulses over the trunk line in accordance with the apparatus unit operated. Responsive to these operations, an automatic directively controlled switch, associated with the trunk line in the dispatcher's office, is operated to control the operation of the supervisory signals. The operation of these signals serves to apprise the dispatcher of the operation of the apparatus unit. In order to operate an apparatus unit, the dispatcher operates a key corresponding to the operation of the apparatus unit desired. This operation causes the automatic impulse sending device in the dispatcher's office to operate. The device then automatically functions to send a code of impulses over the trunk line to operate the directively controlled switch in the selected substation. As a result of the operation of the switch, the proper apparatus unit is controlled, as desired, by the dispatcher.

One of the features of my invention resides in the provision of circuit connections for preventing the repeated operation of a circuit breaker or other apparatus unit at the substation when an attempt is made by the dispatcher to close it on a short circuit or other trouble condition and to apprise the dispatcher of the condition.

Another object of my invention is to provide circuit arrangements for indicating to the dispatcher when a circuit interrupter closes under automatic control and is immediately tripped out by overload condition.

Another feature of my invention resides in the provision of means for indicating at a remote point the mechanical position of a circuit interrupter, irrespective of the manner in which the interrupter is operated.

There are other features of the invention which, together with those set forth, will be described hereinafter with reference to the accompanying drawings.

Referring now to the drawings, Figures 1 to 7, inclusive, show, by means of conventional circuit diagrams, sufficient of the circuits and apparatus to enable my invention to be readily explained and understood.

Figures 1 to 7, inclusive, when placed side by side, with the corresponding lines at the end thereof in alinement, illustrate the circuits of my complete system. Figs. 1, 6 and 7 are diagrammatic views of the equipment located in the load dispatcher's office, while Figs. 2, 3, 4 and 5 are similar views of the selective and controlling equipment in the automatic substation of the system.

Referring now more specifically to Fig. 1, in the upper left-hand corner thereof is shown a key K. This key is one of several groups of keys and is of the ordinary double-throw type automatically returning to normal after being actuated in either direction. A switch F is a finder switch of the usual rotary type, the wipers of which move in a forward direction only. The finder switch is provided with four wipers 123 to 126, inclusive, each of which is adapted to engage a contact bank comprising twenty-five contact members. The wipers of the finder switch F have no normal position. The finder switch F is constructed mechanically in a manner substantially similar to the construction of the rotary switch shown in the patent to Clement No. 1,107,153.

The switch CD is a code sending switch similar in mechanical construction to the finder switch F. On account of differences in circuit design, the switch CD performs different functions than the switch F and is rotated to normal position at the end of each operation.

Figure 2:
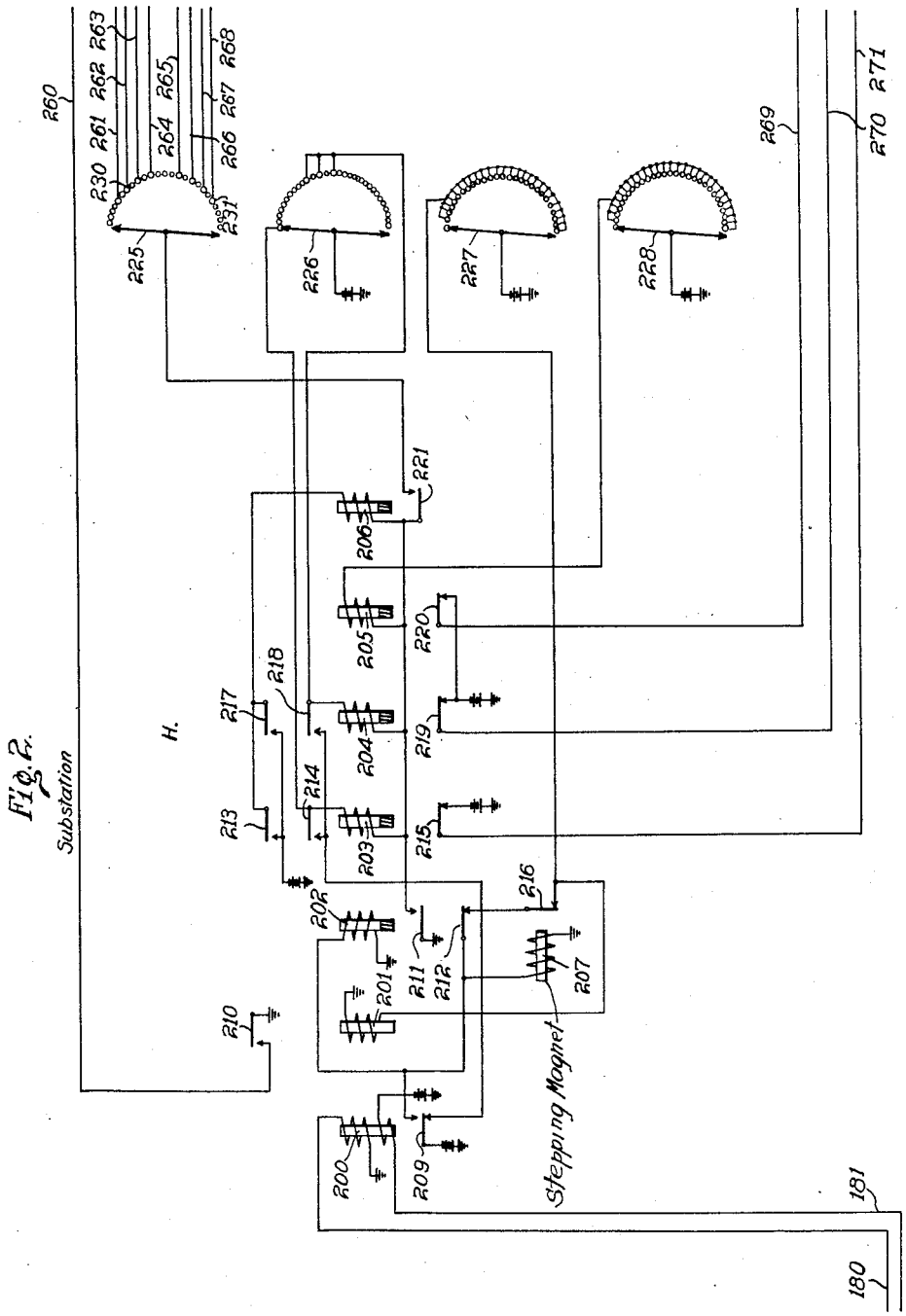

In Fig. 2 there is shown a connector switch H. This switch is of the same general mechanical construction as the switch F. However, its circuits have been so designed as to enable it to be directively operated.

Figure 3:
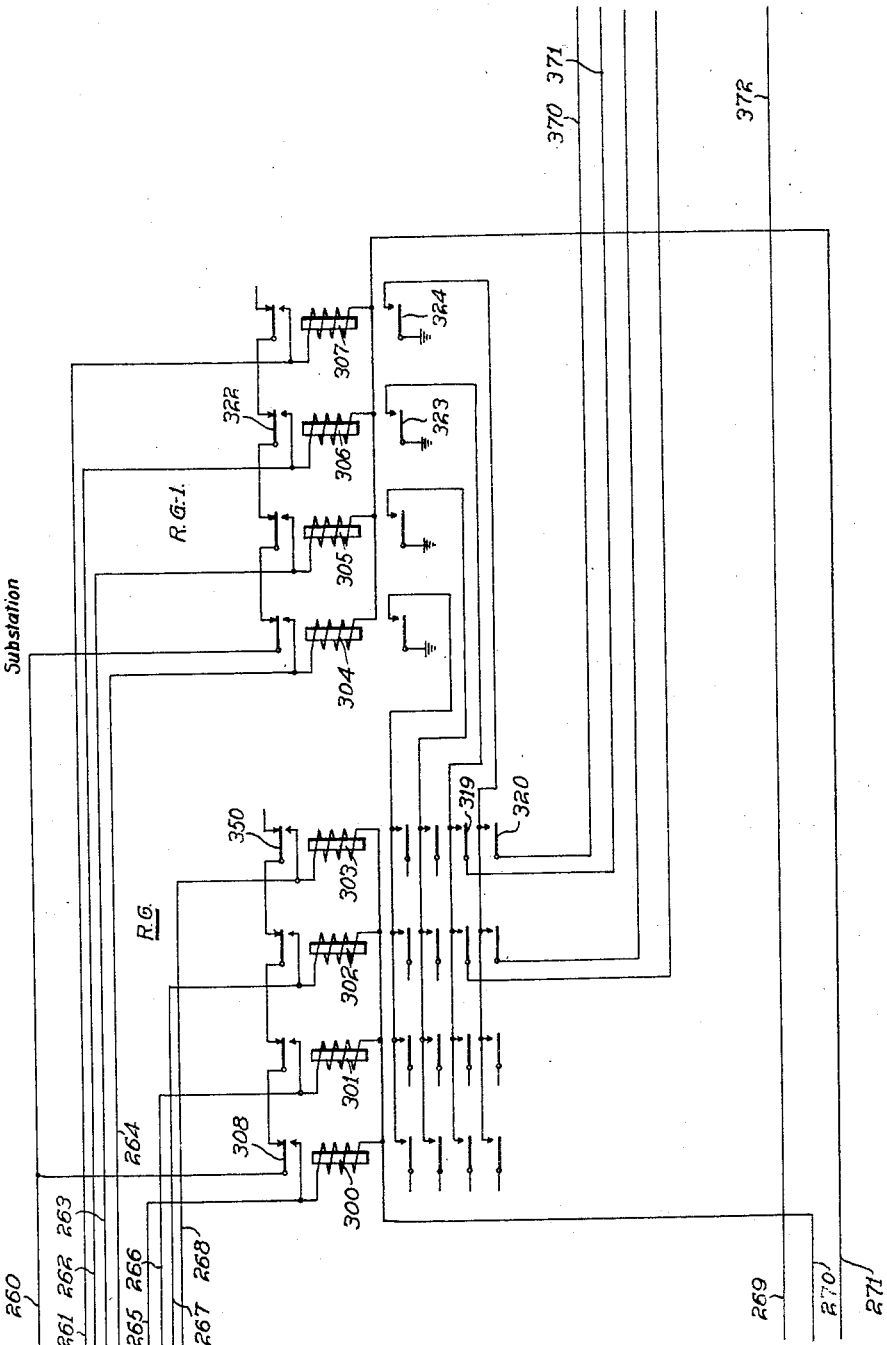

Fig. 3 shows two groups RG–1 and RG of selecting relays, the relay group RG–1 being the primary selecting group and the relay group RG being the secondary selecting group.

Figure 4:
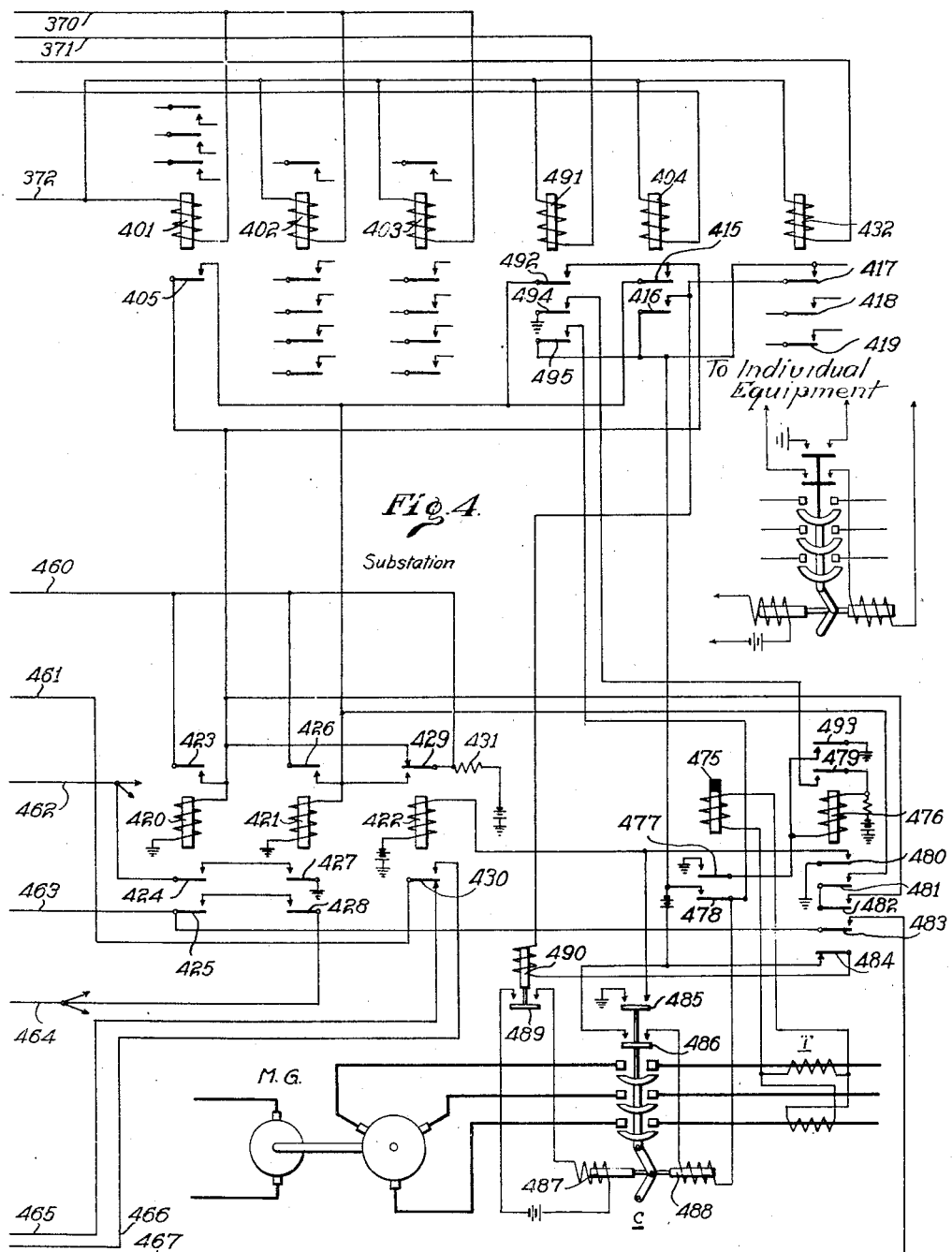

The relays 401 to 403, inclusive, and relays 491, 404 and 432 in Fig. 4 are those selected by the operation of the selective relays of Fig. 3. The circuit breaker C may be any one of the circuit breakers of the substation. As shown, the circuit breaker C, in conjunction with other apparatus (not shown), serves to control the starting of the motor generator set MG at the substation. The relays 420 to 422, inclusive, are provided for the purpose of controlling the operation of the finder switch F–1 of Fig. 5 in accordance with the position of the circuit breaker C. The relays 475 and 476 are provided for signalling the position of the circuit breaker C, as will appear.

Figure 5:
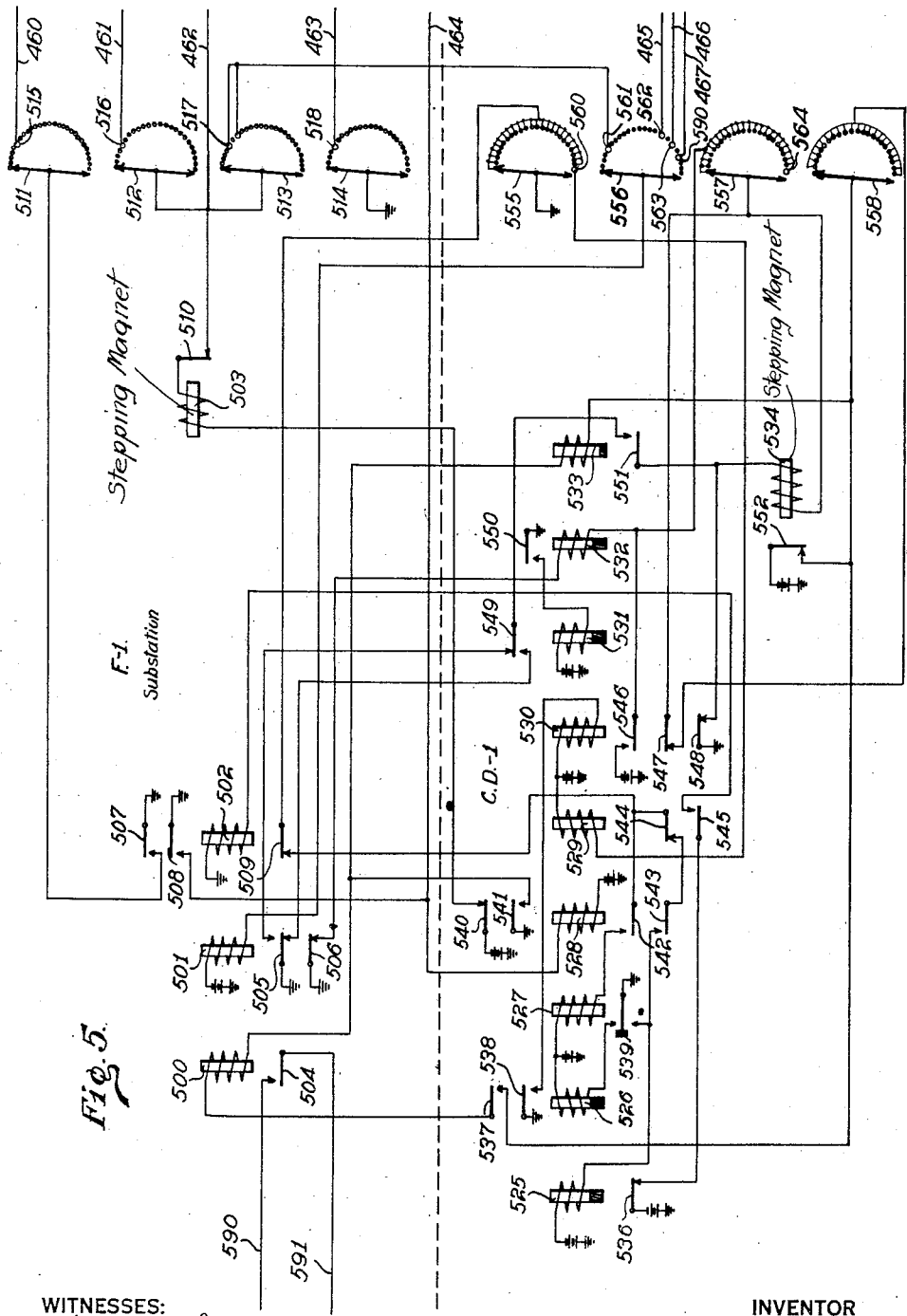

In Fig. 5 is shown a finder switch F–1 and a code sending switch CD–1. These switches are very similar to the switches F and CD previously described.

In Fig. 6 is shown a connector switch H–1 similar to the connector H described above.

The relay groups RG–4 and RG–5 shown in Fig. 7 are selective relays similar to those shown in Fig. 3. The relays 700 to 703, inclusive, control the operation of the supervisory lamps L.

Having briefly described the apparatus shown in the drawings, I will now explain its detailed circuit operation. In order to do this, it may be assumed that the circuit breaker C closes. The closure of this circuit breaker may occur in response to the operation of the ordinary automatic controlling equipment of the substation. This equipment has not been shown in the drawings, as it is well known. In operation, the circuit breaker C connects the motor generator set MG to the alternating-current circuit in the usual manner. Of course, there are other functions to be performed, but this will be handled by the other automatic controlling devices; the closure of the circuit breaker is all that we are concerned with at the present time.

The operation of the circuit breaker C, as stated above, connects the motor of the motor-generator set to the line. As a result of this operation, the overload relay 475 is energized through the transformer T. The function of this relay as is well known, is to trip the circuit breaker in case of an overload.

In the description of the invention, it will be assumed that, at this time, the load is normal and the overload relay does not operate. Another result of the closure of the circuit breaker C is that a circuit is closed which extends from ground by way of the switch 485 and through the winding of the relay 422 to battery. The relay 422 is energized by this circuit and, upon operating, its armature 429 closes a circuit for the relay 421. The relay 421 is energized and attracts its armatures. Prior to this time, the relay 420 has been energized as a result of the relay 422 being inoperative. When the relay 422 was energized, the relay 420 did not retract its armatures, because of the fact that it had established a locking or holding circuit for itself at armature 423.

When the relay 421 is energized, it operates to establish a locking circuit for itself at armature 426 from ground through the winding of relay 421, front contact and armature 426, resistance 421 and battery to ground and to close a circuit which may be traced from ground by way of the armature 427 and its front contact, the front contact and the armature 424, the common conductor 462, the back contact and the armature 510, through the winding of the stepping magnet 503, and thence to the battery by way of the back contact and the armature 540 of the relay 528. The stepping magnet 503 is immediately energized to place its pawl in position to actuate the switch shaft upon its deenergization and, at armature 510, to open its own circuit. As the magnet 503 interrupts its own circuit, it intermittently operates to advance the switch wipers 511 to 514, inclusive, step by step, until said wipers are brought into engagement with the bank contact members 515 to 518, inclusive. In this position, a circuit is completed extending from ground by way of the wiper 514 and its associated bank contact 518, the conductor 463, the armature 425 and its front contact, the front contact and the armature 428, the common conductor 464, and through the winding of the relay 528 to the battery. The relay 528 is immediately operated over this circuit.

As a result of the energization of the relay 528, the circuit of the stepping magnet 503 is opened at armature 540 and, at armature 541, a circuit is completed which extends from ground by way of the said armature and its front contact, through the winding of the slow-release relay 533, and thence to the battery by way of the back contact and the armature 552. Another result of the energization of the relay 528 is that a circuit is closed from ground by way of the wiper 555 and its associated bank contact, the armature 509 and its back contact, the armature 542 and its front contact, and through the winding of the relay 527 to the battery. Another circuit in parallel with that described above, except that it goes by way of the armature 544 and its back contact and the armature 543 and its front contact, may be traced for energizing the relay 525. The relay 527, upon operating, at its armature 539 closes a circuit for the relay 526.

At this point, it may be well to mention the peculiar construction of the armature 539 of the relay 527. Normally the armature 539 rests between its contacts without touching either contact. The armature 539 is weighted and is so constructed that, when the relay 527 is deenergized, the armature 539 vibrates for some time on account of its momentum. The adjustment between the front and back contacts is so made that the armature 539, in decreasing the amplitude of its operation, first permanently opens the circuit of the relay 526. The operation of the relay 525 is without particular function at the present time. The relay 526, upon operating, at its armature 538 closes a circuit for the relay 530 and at its armature 537 establishes a circuit which extends from ground by way of the armature 541 and its front contact, through the winding of the repeating relay 500, the armature 537 and its front contact, and thence to battery, by way of the back contact, and the armature 552 on the stepping magnet 534 of the code sending switch CD–1.

The relay 530 is energized from a previously mentioned circuit and, upon operating, it closes a circuit at armature 546, which extends from the battery, by way of the front contact and the armature 546, through the winding of the slow-release relay 532, and thence to ground, by way of the back contact and the armature 506. The relay 532, upon operating, at armature 550 closes a circuit for the slow-release relay 531. By the operation of the relay 531, a circuit is completed which extends from ground by way of the armature 505 and its back contact, the front contact and the armature 549, the front contact and the armature 551, through the winding of the magnet 534, the wiper 557 and its associated bank contact, and thence to battery, by way of the armature 546 and its front contact. The magnet 534 is energized over this circuit and operates to place its pawl in such position as to operate the switch shaft upon its deenergization. Another result of the energization of the magnet 534 is that the circuit of the slow-release relay 533 is opened as is, also, the circuit of the repeating relay 500 at the armature 552.

When the circuit of the relay 500 is closed, as previously described, this relay operates. As a result of this operation, a circuit is closed over the conductors 590 and 591 for the relay 607 of the connector H–1 in the dispatcher's office, Fig. 6. Upon operating its armature 620, the relay 607 completes a circuit for the slow-release relay 605 in parallel with the stepping magnet 623. Upon attracting its armatures, the relay 605 closes a circuit for the slow-release relay 604 over a circuit from ground and through armature 617, winding of relay 604, first contact and wiper 631 and battery to ground at armature 618 opens one point in the release circuit, removes ground from conductor 646 at armature 685, at armature 686 closes a circuit for the relay 780, and at armature 689 places battery upon the conductor 645. The relay 604, upon operating, at its armature 615, prepares a holding circuit for itself, removes battery from the conductor 662 at the armature 616, at armature 682 opens one point in the circuit of the relay 680, and at the armature 614 closes a circuit for the slow-release relay 601, from ground through battery, armature 614, winding of relay 601 and front contact and armature 617 to ground.

The energization of the relay 601 merely prepares certain circuits which function later. The magnet 623, upon being energized, places its pawl in position to operate the switch shaft upon the deenergization of the magnet.

The relay 780, upon energizing, establishes a locking circuit for itself at armature 784 to ground by way of the armature 787 of the relay 782 and its back contact. A further result of the energization of the relay 780 is that, at armature 783, a circuit is prepared for placing ground on the conductor 184.

Now when the circuit of the relay 500 in the code sending switch CD–1 is opened by the energization of the magnet 534, previously described, this relay is deenergized to open the circuit of the line relay 607 of the connector H–1. The deenergization of the line relay 607 opens the circuit of the slow-release relay 605 and also the circuit of the magnet 623. The retraction of the armature of the magnet 623 causes its associated pawl to advance the switch shaft carrying the switch wipers 630 to 633, inclusive, into engagement with the second set of bank contacts. The operation of the connector H–1 from its normal position closes a circuit for the relay 606 from ground through the winding of relay 606 and through the contact and bank of switch wiper 632, battery to ground. The relay 606, upon operating, places ground upon the conductor 650 at the armature 619, opens the original energizing circuit of the relay 780 at armature 684, and, at the armature 621, closes a circuit for the relay 770. The relay 770, upon attracting its armatures, closes a locking circuit for itself at the armature 771 and at the armature 772 closes a circuit for an audible alarm (not shown) and the alarm lamp 773. The attention of the load dispatcher is thus drawn to the fact that an operation has been performed at the substation.

Referring now to the code sending switch CD-1, it will be remembered that the energization of the stepping magnet 534 also opened the circuit of the slow-release relay 533. After a short interval, this relay deenergizes and opens the circuit of the stepping magnet 534 at armature 551. The magnet 534 immediately deenergizes to advance the wipers 555 to 558, inclusive, into engagement with the first set of bank contacts and, at armature 552, closes the circuit of the repeating relay 500 and also the circuit of the relay 533. The relay 533 energizes to close the circuit of the stepping magnet 534 and the repeating relay 500 energizes to close the circuit of the line relay 607 to the connector H-1. The alternate operation of the slow-release relay 533 and the stepping magnet 534 continues until the wipers 555 to 558, inclusive, are brought into engagement with the bank contact set which includes the contact 561. When this occurs, a circuit is completed extending from ground by way of the armature 427 and its front contact, the front contact and the armature 424, the common conductor 462, the wiper 513, the bank contact 517, the bank contact 561, the wiper 556, and through the winding of the relay 501 to battery. The two contacts connected with the wiper 513 are connected to contact 561 since these two produce codes which have the same first pause period but different final pause periods. Thus, all of the contacts of the finder switch, the codes of which produce pauses at the same time in the code, may be tied together in this manner to the proper contact on the code sender.

The code sender, as is described in detail, is arranged to transmit a number of impulses, twenty-five in all. Each combination of twenty-five impulses is distinguished by two pause periods occurring during different times during the transmission of all these impulses. The time when these pause periods occur is determined by the position of the wipers on the finder switches 511 to 514. Thus, with the wiper 513 on contact 517, the first pause occurs when the switch wiper 556 has transmitted sufficient impulses to step itself to the contact 561.

The relay 501 is energized over this circuit and operates at armature 505 to open the circuit of the stepping magnet 534 and to prepare another circuit at the front contact of this armature for the said magnet. An additional result of the operation of the relay 501 is that the circuit of the slow-release relay 532 is opened at armature 506. After a short interval of time, the relay 532 is deenergized to open the circuit of the slow-release relay 531. Upon the retraction of the armature 549 of the relay 531, a circuit is completed which extends from ground by way of the armature 505 and its front contact, the back contact and the armature 549, the front contact and the armature 551, through the winding of the stepping magnet 534, the wiper 557 and its associated bank contact, and thence to the battery, by way of the armature 546 and its front contact.

The magnet 534 is energized over this circuit and actuates its armatures, to position its associated pawl, to open the circuit of the slow-release relay 533, and also to open the circuit of the repeating relay 500. The slow-release relay 533 is deenergized, after an interval, to open the circuit of the stepping magnet 534, which is deenergized, to again close the circuit of the slow-release relay 533 and to close the circuit of the repeating relay 500. By the movement of the switch wipers, occurring responsive to the deenergization of the magnet 534, the circuit of the relay 501 is opened and this relay deenergizes to open the circuit of the magnet 534 at armature 505, at the back contact of this armature to prepare another circuit for it, and to close a circuit at armature 506 for the relay 532. The operation of relay 532 closes a circuit for the relay 531. The operation of relay 531 closes the original stepping circuit of the magnet 534. The alternate operation of the relay 533 and the magnet 534 again occurs until the wipers 555 to 558, inclusive, are advanced into engagement with the bank contact set which includes the bank contact 563.

During the operation of the code sending switch CD-1, while its wipers were rotated in search of the contact set which includes the bank contact 561, the circuit of the relay 500 was intermittently opened and, consequently, the circuit of the line relay 607 of the connector H-1. It is true that the operation of the slow-release relay 533 indirectly controls the speed of the operation of the repeating relay 500 and the speed of operation of the line relay 607 of the connector H-1. It is also true that at each deenergization of the relay 607, the circuit of the slow-release relay 605 is opened. In order to obviate any false operation, which would occur were the relay 605 to be deenergized between deenergizations of the relay 533 in the switch CD-1, the time constant of the slow-release relay 533 is materially faster than the time constant of the slow-release relay 605.

Each time the circuit of the line relay 607 is opened, this relay is deenergized to open the circuit of the slow-release relay 605 and also the circuit of the stepping magnet 623. The magnet 623 is thus deenergized a plurality of times to advance the wipers 630 to 633, inclusive, into engagement with the bank contact set, which corresponds to the number of impulses sent over the trunk line, as determined by the number of steps that the code sending switch CD-1 has taken to find the bank contact set including the contact 561. It will be assumed that the bank contact set selected by the connector H-1 includes the contact 640.

As the wipers of the connector H-1 have been rotated past the normal set of bank contacts, the original energizing circuit of the slow-release relay 604 is opened. However, the relay 604 is not deenergized until the termination of the first series of impulses. This result is due to the fact that, at each retraction of the armature 620 of the line relay 607, a circuit is closed for the relay 604 from ground through battery, armature 620 and its back contact, the front contact and armature 615, winding of relay 604 and front contact and armature 617 to ground.

By the deenergization of the relay 604 at the end of the first series of impulses, the circuit of the slow-release relay 601 is opened at the armature 614, at armature 682 a circuit is prepared for the relay 680 from ground over armature 617 and its front contact, through the winding of relay 680, armature 691 and its back contact, back contact and armature 682, the back contact and armature 620, battery to ground, and a circuit is closed at the armature 616 which extends from the battery, by way of the back contact and armature 616, the conductor 662, through the winding of the relay 708, the conductor 651, the bank contact 640, the wiper 630, the front contact and the armature 608, and the front contact and the armature 617 to ground. The relay 708 is energized over this circuit and operates to open the locking circuits of the relays in the group RG-5 at the armature 725, to close its locking circuit at the front contact of this armature to ground on the conductor 650, which has been grounded previously by the operation of the relay 606. Another result of the energization of the relay 708 is that at the armature 726, a selecting circuit is prepared.

Returning now to the operation of the code sending switch CD-1, when the wipers 555 to 558, inclusive, are brought into engagement with the bank contact set which includes the contact 563, as previously described, a circuit is completed which extends from ground by way of the armature 427 and its front contact, the front contact and the armature 424, the common conductor 462, the wiper 512, the bank contact 516, the conductor 461, the armature 430 and its front contact, the conductor 466, the bank contact 563, the wiper 566, and through the winding of the relay 501 to battery.

The relay 501 is energized over the above circuit and operates, as before, to open the circuit of the stepping magnet 534 at the armature 505 and to open the circuit of the slow-release relay 532 at armature 506. The slow-acting relay 532 is deenergized to open the circuit of the slow-release relay 531, which also retracts its armature. As a result of the latter operation, the stepping magnet 534 is operated to open the circuit of the interrupter relay 533, which retracts its armature to open the circuit of the stepping magnet 534. The magnet 534 is thus deenergized to advance the switch wipers 555 to 558, inclusive, into engagement with the next set of bank contacts. As a result of this operation, the circuit of the relay 501 is opened and this relay retracts its armatures.

The deenergization of the relay 501 opens the circuit of the stepping magnet 534 and closes a circuit for the slow-release relay 532. The relay 532 is energized and operates to establish a circuit for the relay 531. The latter relay, upon being energized, reestablishes the circuit of the stepping magnet 534. The stepping magnet 534 now intermittently operates to advance the wipers 555 to 558, inclusive, until they are brought into engagement with the twenty-fifth set of bank contacts.

During the second advancement of the wipers of the code sending switch, each time the stepping magnet 534 operates, the circuit of the repeating relay 500 is opened and this relay retracts its armature to produce a corresponding number of interruptions in the circuit of the line relay 607 of the connector H-1. Upon each retraction of the armature 620 of the relay 607, the circuit of the stepping magnet 623 is opened and the magnet operates to advance the wipers 630 to 633, inclusive, into engagement with the bank contact set which corresponds to the number of impulses sent over the trunk line, as determined by the second movement of the wipers of the code sending switch CD-1. It will be assumed that this contact set includes the bank contact 641.

When the wipers of the connector H-1 are brought into this position, no more impulses are sent over the trunk line until the slow-release relays 533 and 532 of the code sending switch CD-1 are deenergized. During the advancement of the switch wipers to their second positions, the operation of the armature 620 caused the energization of the relay 680. The operation of this relay is without function at the present time. When the wiper 631 engages the twelfth, thirteenth and fourteenth set of bank contacts, a circuit is completed for the relay 603 from ground to battery, wiper 631, twelfth contact of the switch bank, through the winding of relay 603 and front contact, and armature 617 to ground. The relay 603, upon being energized, closes a circuit for the slow-release relay 601 at the armature 611, at the armature 612 prepares a circuit for maintaining itself energized over a circuit from ground through battery, armature 620 and its back contact, front contact and armature 612, through the winding of relay 603 and the front contact, and armature 617 to ground, at armature 691 opens the circuit of the relay 680, and at the armature 613 disconnects the battery from the conductor 661. The deenergization of the relay 680 is without function at this time.

A short interval after the wipers 630 to 633, inclusive, of the connector H–1 have been rotated into engagement with the bank contact set including the contact 641, the circuit of the slow-release relay 603 is opened. The relay 603 retracts its armatures, thereby opening the circuits of the slow-release relay 601 at the armature 611, preparing a circuit at armature 691 for the slow-release relay 680, and, at the armature 613, completes a circuit which extends from the battery by way of said armature and its back contact, the conductor 661, through the winding of the relay 705, the conductor 657, the bank contact 641, the wiper 630, the front contact and the armature 608 to ground by way of the front contact and the armature 617. The relay 705 is energized over this circuit and operates to establish a locking circuit for itself at the armature 719, and to prepare a circuit at the armature 720 for energizing the relay 700.

As previously described, the code sending switch CD–1 is stepped around to its twenty-fifth position after the termination of the second series of impulses. The wipers of the connector switch H–1 are also stepped in synchronism with the wipers of the code sending switch CD–1 and are brought to rest in engagement with their twenty-fifth set of contacts.

In the code sending switch CD–1, the operation of the wipers 555 to 558, inclusive, to their twenty-fifth set of bank contacts opens the circuit of the relay 527 and also the energizing circuit of the slow-release relay 525. The relay 527 immediately retracts its armature. By reason of the peculiar construction of the armature 539, previously described, this armature vibrates for an interval of time, thus alternately closing the circuits of the slow-release relays 526 and 525. For the reason explained previously, the relay 525 is the first to retract its armatures. The deenergization of the relay 525 prepares a circuit for the relay 502.

Another result of the switch wipers of the code sending switch CD–1 being brought into engagement with the twenty-fifth set of bank contacts is that a circuit is completed extending from ground by way of the wiper 555, the bank contact 560, and through the winding of the relay 529 to battery. The relay 529 operates to open another point in the energizing circuit of the relay 525 at the armature 544 and to close the circuit of the relay 502 at the armature 545. Upon being energized, the relay 502 operates to establish another circuit for the relay 528 at the armature 508 and to close a circuit at the armature 507 which extends from ground by way of the said armature and its front contact, the wiper 511, the bank contact 515, the conductor 460, and through the winding of the resistor 431 to battery. This circuit serves to short-circuit the relays 420 and 421. Consequently, these relays retract their armatures. The relay 420, upon retracting its armatures, opens its locking circuit at armature 423, also removes ground from the common conductor 462 at the armature 424, and at the armature 425 removes one ground connection located at wiper 514 from the conductor 464. The deenergization of the relay 421 causes this relay to open its locking circuit at the armature 426 and to restore certain other circuits to normal at its other armatures.

In the connector H–1, the relay 680, which has been energized by the operation of the armature 620 of the line relay 607 is deenergized, due to the cessation of the operation of the armature 620. The operation of this relay is without function for the present. The relay 602 is also deenergized. These results are caused by the fact that the repeating relay 500 is retained energized for an interval after the wipers of the code sending switch CD–1 engage the twenty-fifth set of bank contacts. Upon retracting its armatures, the relay 602 closes a circuit, which extends from ground by way of the back contact and the armature 610, the conductor 660, through the winding of the low resistance relay 782, the armature 726 and its front contact, the front contact and the armature 720, and through the winding of the relay 700 to battery. This circuit serves to energize the relay 700. The energization of the relay 700 closes a circuit for the supervisory lamp 718 and opens the circuit of the supervisory lamp 717. By reason of these changes in the supervisory signalling devices, the dispatcher is apprised of the change in position of the circuit breaker C at the substation. The operation of the relay 782 opens the locking circuit for the relay 780 at the armature 787. The relay 780 immediately retracts its armatures. The relays 780 and 782 are provided for the purpose of checking the operation of the supervisory signalling devices, as will appear more fully hereinafter.

Returning now to the operation of the code sending switch CD-1, the slow-release relay 526 is finally deenergized and it opens the circuit of the relay 500 at the armature 537 and, at the armature 538, it opens the circuit of the relay 530. The deenergization of the relay 530 opens the circuit of the slow-release relay 532 at the armature 546 and, at the armatures 547 and 548, completes a circuit which extends from ground by way of the armature 548 and its back contact, through the winding of the stepping magnet 534, the armature 547 and its back contact, the twenty-fifth bank contact, with which the wiper 558 is in engagement, and the said wiper, and thence to the battery by way of the back contact and the armature 552. The stepping magnet 534 is energized over this circuit and operates to restore the wipers 555 to 558, inclusive, to their normal positions, whereupon the circuit of the magnet 534 is opened and its operation ceases.

As a result of the wipers of the code sending switch being brought to their normal position, the circuit of the relay 529 is opened and this relay retracts its armatures to open the circuit of the relay 502. The slow-release relay 532, upon retracting its armature, opens the circuit of the slow-release relay 531, which is also de-energized. The relay 502, upon retracting its armatures, opens the circuit of the relay 528 at the armature 508 and, at the armature 507, removes the shunt from the circuit of the relays 420 and 421. It will be remembered that the relay 422 is now in an operated position and, consequently, the relay 421 is again energized to establish a locking circuit for itself at the armature 426. The operation of the other armatures of the relay 421 is without effect at this time as the relay 420 is inert. The deenergization of the relay 528 in the code sending switch CD-1 merely restores certain circuits to their normal condition. The deenergization of the relay 500, which occurred immediately after the deenergization of the slow-release relay 526, opens the circuit of the line relay 607 of the connector H-1.

As the circuit of the relay 607 is opened, this relay is deenergized to open the circuit of the slow-release relay 605. Upon retracting its armatures, the relay 605 closes a circuit for the stepping magnet 623 which extends from battery by way of the wiper 632 in engagement with the twenty-fifth bank contact, the said bank contact, the back contact and the armature 624, the back contact and the armature 618, and through the winding of the stepping magnet 623 to ground. The stepping magnet 623 operates to restore the wipers 630 to 633 to their normal position.

In the above described manner, the apparatus is released following the sending of the supervisory signal to the dispatcher, notifying him of the automatic operation occurring in the substation.

It will be noted that the supervisory signal 715 is not actuated immediately after the two series of impulses which caused its selection. It is operated when the wipers of the connector H-1 are brought into their twenty-fifth position and remain there for an interval. By this circuit arrangement, false operation of the supervisory signals is prevented, because, should either the switch CD-1 in the substation or the connector H-1 in the dispatcher's office get out of synchronism with the other, the wipers of each of the switches will not be in their twenty-fifth position simultaneously. Consequently, the supervisory signals will not be operated. When there is no change in the supervisory signals, the relay 782 is not energized. Consequently, the relay 780 remains energized. Now, when the relay 605 is deenergized, as before described, a circuit is completed extending from ground by way of the armature 685 and its back contact, the conductor 646, the armature 783 and its front contact, the conductor 184, and through the winding of the relay 191 to battery. The relay 191, upon energizing, causes the finder switch F and the code sending switch CD to function to send out a checking code, the results of which will be described subsequently.

In the same manner as above described, any change in position of any of the contactors, or other apparatus units, causes the finder switch F-1, the code sending switch CD-1 and the connector H-1 to be operated to control the actuation of the supervisory signal.

It will now be assumed that the circuit breaker C at the substation is closed and that the load dispatcher desires to open it. In order to accomplish this result, the dispatcher operates the double-throw key in a direction to momentarily close the springs shown on the right.

The operation of the key K closes a circuit which extends from the positive pole of the battery B by way of the working contact of spring 100, the said spring, through the winding of the relay 106, the conductor 183, the front contact and the armature 714, and thence to ground. The relay 106 is energized over this circuit and operates to establish a locking circuit for itself at the armature 173 over a path extending from the positive pole of the battery B, the spring 176 and its resting contact armature 173 and its front contact through the winding of the relay 106, the conductor 183, and thence to ground by way of the front contact and the armature 714. The operation of the armature 172 of the relay 106 closes a circuit from the monitoring lamp 174. This lamp remains lighted through the sending operation, even after the key K restores to normal, in order to inform the dispatcher that the desired code is being sent. Another result of the energization of the relay 106 is that at the armature 104 a circuit is completed which extends from ground by way of the armature 104 and its working contact, through the winding of the stepping magnet 109 of the finder switch F, the armature 132 and its back contact, and thence to the battery by way of the back contact and the armature 120. As the stepping magnet 109 interrupts its own circuit, it operates as a buzzer to advance the switch wipers 123 to 126, inclusive, until they are brought into engagement with the bank contacts 127 to 130, inclusive, which is the contact set associated with the key K in the finder F.

When the switch wipers are brought into engagement with this set of bank contacts, a circuit is closed which extends from ground through the winding of the relay 108 by way of the common conductor 134, which is common to all the keys in the group, the front contact and the armature 101, the bank contact 130, the wiper 126 and the coil of the relay 113 to battery. The relay 113 is energized over this circuit, and, upon operating, opens the circuit of the stepping magnet 109, thus stopping the operation of the finder switch, and closes a circuit for the relay 111 extending from battery by way of the armature 120 and its front contact, through the winding of the relay 111, the bank contact with which the wiper 160 is in engagement, and the said wiper to ground, at armature 121 closes a circuit which extends from ground by way of the armature 121 and its front contact, through the winding of the slow-release relay 143, and thence to battery by way of the armature 152 and its back contact. The relay 111, upon being energized, closes a circuit for the slow-release relay 110 at its armature 117.

The armature 117 of the relay 111 is constructed in a manner similar to the relay 527 of the code sending switch CD-1 and, consequently, when the relay becomes deenergized, the armature 117 vibrates for an interval afterwards. The relay 110, upon operating, at the armature 115 closes a circuit for the relay 140 and, at the armature 116, establishes a circuit which extends from ground by way of the armature 121 and its front contact, through the winding of the repeating relay 144, the front contact and the armature 116 and to battery by way of the armature 152 and its back contact. The repeating relay 144, upon operating, at its armature 154, closes a bridge across the conductors 180 and 181 extending to the substation whereby the line relay 200 of the connector H is energized.

The line relay 200, upon operating, closes a circuit for the slow-release relay 202 in parallel with the stepping magnet 207. The stepping magnet 207 is energized to place its associated pawl in position to actuate the switch shaft. The slow-release relay 202, upon being energized, closes a circuit for the slow-release relay 203 from ground through armature 211 and the front contact, through winding of relay 203 switch bank 226 and battery to ground. The latter relay operates to energize the slow-release relay 206. The operations of these relays have the same functions as described in connection with the connector H-1.

Returning now to the operation of the code sending switch CD, the relay 140, upon operating, at its armature 148 closes a circuit for the slow-release relay 141 from ground through battery, armature 148 and its front contact, through winding of relay 141 and back contact, and armature 156 to ground. The relay 141, upon attracting its armature, establishes a circuit for the slow-release relay 142. The latter relay, upon being energized closes a circuit which extends from ground by way of the armature 155 and its back contact, the front contact and the armature 151, the front contact and the armature 153, through the winding of the magnet 146, by way of the wiper 162 and its associated bank contact, and thence to battery by way of the armature 148 and its front contact. The stepping magnet 146 is energized over this circuit and operates to place its associated pawl in position to actuate the switch shaft and also to open the circuit of the relays 144 and 143 at the armature 152. The deenergization of the relay 144 opens the circuit of the line relay 200 of the connector H at the substation. The slow-release relay 143, upon being deenergized, opens the circuit of the stepping magnet 146, which is also deenergized, to reestablish the circuit of the relays 143 and 144, and to advance the switch wipers 160 to 163, inclusive, into engagement with their first set of bank contacts. The stepping of the code sending switch CD continues under the control of the slow-release relay 143 until the wipers of the switch are brought into engagement with the contact set which includes the contact 165. When this occurs, a circuit is completed which extends from ground by way of the armature 103 of the relay 106 and its front contact, the wiper 125, the bank contact 129, the bank contact 165, the wiper 161, and through the winding of the relay 145 to the battery.

The relay 145 is energized over this circuit and, upon operating, it opens the circuit of the stepping magnet 146 at the armature 155, at the front contact of this armature prepares another circuit from ground over armature 155 and its front contact and back contact and armature 151 over the circuit for the stepping magnet traced before for the magnet and at the armature 156 opens the circuit of the slow-release relay 141. The rotation of the switch, of course, ceases.

The slow-release relay 141, upon being deenergized, opens the circuit of the slow-release relay 142. After a short interval, the slow-release relay 142 retracts its armature and closes a circuit which extends from ground by way of the armature 155 and its front contact, the back contact and the armature 151, the front contact and the armature 153, through the winding of the stepping magnet 146, the wiper 162, the bank contact with which the said wiper is in engagement, and thence to battery by way of the front contact and the armature 148. The stepping magnet 146 operates to attract its armature, thereby placing the pawl in actuating position and opening the circuit of the slow-release relay 143 and also the circuit of the relay 144.

In accordance with the first operation of the code sending switch CD, a series of interruptions is produced in the circuit of the line relay 200 of the connector H. This relay is deenergized a plurality of times in response thereto. As a result of the retractions of the armature 209, the circuits of the slow-release relay 202 and the magnet 207 are opened. The deenergizations of the magnet 207 serve to advance the switch wipers 225 to 228, inclusive, in engagement with the bank contact set which corresponds to the number of impulses sent over the trunk line and, consequently, the position of the wipers 160 to 163, inclusive, of the code sending switch CD. At the first off-normal step of the switch, the relay 201 is energized to ground the conductor 260. It will be assumed that the bank contact set to which the wipers 225 to 228, inclusive, are stepped includes the bank contact 230.

During the interval that the slow-release relays 141 and 142 in the code sending switch are being deenergized, the slow-release relay 203 of the connector H, which has been maintained energized by the continued operation of the armature 209, is deenergized. As a result of this operation, a circuit is completed which extends from ground by way of the armature 211 and its front contact, armature 221 and its front contact, wiper 225, bank contact 230, conductor 262, through the winding of the relay 306, conductor 271, and to battery, by way of the armature 215 and its back contact. The relay 306 is energized over this circuit and operates to close a locking circuit for itself from ground over armature 210 and its front contact, conductor 260, armature 322 and its front contact, through the winding of relay 306, and to battery over the conductor 271 as traced above at the armature 322 to ground on the conductor 260.

Returning now to the operation of the code sending switch CD, the deenergization of the slow-release relay 142 closes a circuit for the magnet 146 from ground through armature 155 and its front contact, back contact and armature 151, front contact and armature 153, through the winding of relay 146, the wiper 102 and its back, front contact and armature 148 and battery to ground which is energized to place its associated pawl in actuating position and to open the circuit of the slow-release relay 143 and also the circuit of the repeating relay 144. The slow-release relay 143, upon being deenergized, opens the circuit of the stepping magnet 146, which is deenergized. The retraction of the armatures of the magnet 146 advances the switch wipers another step and also closes the circuit of the interrupting relay 143 and the repeating relay 144. By the movement of the switch wipers, the circuit of the relay 145 is opened and this relay retracts its armatures to open the circuit of the magnet 146 and to close the circuit of the slow-release relay 141. The energization of the relay 141 closes the circuit of the relay 142.

The operation of the relay 142 again starts the operation of the stepping magnet 146. The magnet 146 is now intermittently operated to advance the wipers 160 to 163, inclusive, into engagement with the bank contact set, which includes the contact 166. A circuit is now closed which extends from ground by way of the armature 103 of the relay 106 and its front contact, armature 119 of the relay 108 and its front contact, wiper 124, bank contact 128, bank contact 166, wiper 161, and through the winding of the relay 145 to battery. The relay 145 is energized to momentarily stop the operation of the switch wipers in the same manner as before described.

The repeating relay 144 operates to interrupt the circuit at the line relay 200 of the connector H in the same manner as before during the second movement of the wipers of the switch. The line relay 200 operates to control the operation of the stepping magnet 207 in advancing the wipers 225 to 228, inclusive, into engagement with the proper bank contact set, which, it will be assumed, includes the bank contact 231. At the termination of this series of impulses, the slow-release relay 204, which has been energized while the switch wipers were being rotated past the ninth, eleventh and thirteenth set of bank contacts and has been maintained energized by the operation of the line relay 200, is deenergized. A circuit is then closed which extends from ground by way of the front contact and the armature 211, the armature 221 and its front contact, the wiper 225, the bank contact 231, the conductor 268, through the winding of the relay 303, the conductor 270, and the armature 219 and its back contact to battery. The relay 303 is operated over this circuit and attracts its armatures to establish a locking circuit for itself at the armature 350 from ground through armature 210 and its front contact, conductor 260, armature 308 and its back contact, armature 350 and its front contact, through the winding of relay 303 and to battery over the conductor 270 as traced above and to prepare a circuit at the armature 319 for the relay 491 in the substation.

Going back now to the operation of the code sending switch CD, the slow-release relays 141 and 142 operate, as before, and the magnet 146 is intermittently operated after an interval to advance the wipers 160 to 163, inclusive, into engagement with the twenty-fifth set of bank contacts.

When the wipers 160 to 163, inclusive, are brought into engagement with the twenty-fifth set of bank contacts, the circuit of the stepping magnet 146 is opened and its operation ceases temporarily. A circuit is also completed which extends from ground by way of the wiper 160 and its associated twenty-fifth bank contact, and through the winding of the relay 112 to battery. The relay 112 is energized to prepare a circuit for the stepping magnet 109, the function of which will be described subsequently. Another result of the rotation of the wipers to the twenty-fifth position is that the circuit of the relay 111 is opened. The relay 111 is immediately deenergized to cause its armature 117 to vibrate. The relay 110 is thus maintained energized for an interval after the relay 111 is deenergized. In the same manner as before described, the wipers of the connector H are brought into engagement with their twenty-fifth set of bank contacts. Now, during the interval that the relay 110 in the dispatcher's office is maintained energized, the slow-release relay 205 in the connector H at the substation is deenergized and a circuit is completed which extends from battery by way of the back contact and the armature 220, the conductor 269, the conductor 372, through the winding of the relay 491, the conductor 371, the armature 319 and its front contact, and thence to ground, by way of the front contact and the armature 323. The relay 491 is operated over this circuit and closes a circuit at its armature 495 for the trip coil 488 of the circuit breaker C, from the contacts of the pallet switch 486, through the winding of the relay of trip coil 488, front contact and armature 495 and through the battery, back to the pallet switch 486, and at the armature 492, closes a circuit for the relay 421 from ground to the winding of relay 421 through armature 415 and its front contact, armature 429 and its back contact, and battery to ground, and closes a circuit for relay 420.

By the tripping of the circuit breaker C, in the same manner as before described, the dispatcher receives a supervisory signal back in order to notify him that the desired operation has taken place.

There is a slight difference in the operation in this instance, however, inasmuch as the relay 106 is locked energized, when the lamp 717 is lighted by the deenergization of the relay 700, which occurs responsive to the sending back of the opening code. The relay 700, upon retracting the armature 714, causes the relay 106 to deenergize.

The deenergization of the relay 106 opens the operating circuits of the finder switch F and the code sending switch CD insuring that the operating code will not be sent to the substation again.

The contact 492 on the relay 491 at the substation is provided so that, in case the circuit breaker C should already be in an open position, an answer-back signal will be given to the dispatcher in order to check the supervisory signals.

The locking relay 106 also provides means whereby, if, for some reason or other, the code is not transmitted properly, the operation will occur repeatedly until the corresponding contactor or apparatus unit is operated in the substation. By the conjoint action of the checking contact 492 of the relay 491 at the substation and the locking relay 106 associated with the key K, provision is made so that, if the answer-back code is not transmitted properly, it will be sent back repeatedly until the proper indication is given to the load dispatcher.

Returning now to the operation of the code sending switch CD, it will be remembered that the circuit of the slow-release relay 110 is finally opened by the cessation of the vibration of the armature 117. The relay 110, upon being deenergized, opens the circuit of the slow-release relay 140 at the armature 115, at the armature 116 opens the circuit of the relay 144, and at the armature 114 closes a circuit, which extends from the battery, by way of the front contact of the armature 118 and the said armature, the armature 114 and its back contact, the back contact and the armature 132, through the winding of the stepping magnet 109, the front contact and the armature 104 to ground. The magnet 109 is operated over this circuit to advance the wipers 123 to 126, inclusive.

The slow-release relay 140, upon being deenergized, opens the circuit of the slow-release relay 141 and closes a circuit which extends from ground by way of the armature 147 and its back contact, through the winding of the stepping magnet 146, the armature 149 and its back contact, the bank contact with which the wiper 163 is in engagement and the said wiper, and thence to battery, by way of the armature 152 and its back contact. The magnet 146 operates to restore the wipers 160 to 163, inclusive, to normal position. By this operation, the circuit of the relay 112 is opened and this relay is deenergized to open the circuit of the stepping magnet 109 of the finder switch F whereby the rotation of the wipers of the finder switch ceases. The slow-release relay 141, upon retracting its armature, opens the circuit of the slow-release relay 142, which is also deenergized.

Responsive to the deenergization of the relay 144, the line relay 200 of the connector H is released and the relay retracts its armature to cause the restoration of the connector H in the manner described in connection with the connector H-1.

In the above manner, the connection is released responsive to transmitting of the sending operation.

The reason that the finder switch F is given a number of steps at the end of the code transmitting operation is to allow the calls to be evenly distributed over the group of keys. To explain more fully, assuming that another relay, such as 106, is operated in addition to the said relay, by the momentary operation of another key K, were it not for the provision mentioned, the code corresponding to the operated relay would be transmitted indefinitely until the proper answer-back signal were recorded on the lamps, and there would be no actuating code sent out for the other relay, which was operated. By means of the circuit arrangement shown, this difficulty is obviated and one transmitting operation cannot indefinitely prevent the remaining operations.

The relay 113, of course, is deenergized as soon as the switch wiper 126 is rotated from engagement with the back contact 130 and the circuit of the stepping magnet 109 is closed. If no other relay, such as 105 or 106, is operated, the finder switch F may again rotate the wipers 123 to 126, inclusive, into engagement with the bank contacts 127 to 130, inclusive.

In case the dispatcher momentarily operates the key K in the other direction, thus operating the springs shown at the left, the relay 105 is locked energized and the code for closing the contactor is sent out, although the wipers 123 to 126, inclusive, of the finder switch F are brought into engagement with the bank contacts 127 to 130, inclusive. The difference in the code is due to the fact that the common relay 108 is not energized at this time, and consequently, the wipers of the code sending switch CD are first stopped in engagement with the bank contact set which includes the contact 164. The operation of the finder F, the code sender CD and the connector H causes the selection of the relay 404 at the substation. This relay functions to close the circuit breaker C. These operations will be described subsequently.

The dispatcher is also provided with a checking key K-5. The operation of this key controls the energization of the relay 191. The relay 191, upon energizing, causes the operation of the finder F and the code sender CD to control the movement of the connector H at the substation whereby it is possible for him to send out a certain code which will operate the relays 401, 402 and 403. These relays carry contacts for closing the circuits of all relays, such as relays 420 and 421, in the substation. Consequently, when the checking code is sent out, all the apparatus units codes will be sent back to the dispatcher in order to check his supervisory signals.

Under certain conditions, it will be seen that it may be desirable to operate a plurality of contactors, or other apparatus units, in the substation simultaneously in order to take care of standard operations or emergency conditions. To this end, I have provided a relay 432 which is adapted to close circuits at the armatures 417, 418, 419 for the contactors that it is desired to operate. The relay 432 is energized in the same manner as the relay 491. The operation of this relay and the contactors controlled by it will be apparent without further explanation.

It will be seen that the provision of the locking relays, such as 105 and 106, also renders it impossible to send an unnecessary code for the reason that, if the dispatcher should inadvertently throw the key K in the same direction as it had been thrown just previously, assuming no change in the associated apparatus unit at the substation, the relay 105 or 106, as the case may be, would not be energized and no operation would occur. As no monitoring lamp is lighted, the attention of the dispatcher is called to his mistake.

Under certain conditions, the dispatcher may find it desirable to release the connection in case he inadvertently operates a key or, for any other reason, desires to stop the sending of the code. In order to accomplish this result, it is only necessary for the dispatcher to operate the key momentarily in opposite direction to that which he had previously thrown it. To describe this operation, it will be assumed that the key K has been thrown to the right and that the relay 106 is locked energized. To stop the sending operation, the dispatcher will throw the key to the left, thereby opening the locking circuit of the relay 106, which deenergizes, and allows the sending apparatus to be restored to normal conditions in the usual manner. The relay 105 is not energized at this time for the reason that the relay 700 is energized and no battery is connected to the winding of the relay 105. In the above manner, the sending apparatus including equipment at the dispatcher's office and the substation is restored to normal conditions.

The operation set forth above is the normal one when any change occurs in position of circuit breakers or other apparatus units at the substation. However, it sometimes occurs that when the circuit breaker operates under automatic control, there will be an excessive rush of current, due to short-circuit conditions. In this event, it is necessary to apprise the dispatcher of the existence of the abnormal condition at the substation. In order to do this, it will be assumed that the circuit breaker C closes, as before, under automatic control; and it will be assumed, further, that there is a short-circuit present. Under these conditions, the slow-to-energize relay 475 will be operated. As a result of the energization of this relay, a circuit is completed for the relay 476 at armature 477, and at the armature 478, the circuit of the tripping coil 488 of the circuit breaker C is energized.

The relay 476, upon being energized, establishes a locking circuit for itself at armature 493, at armature 479 prepares a shunt circuit to ground at armature 494, closes a circuit for the relay 422 at armature 480, and at armatures 481 and 482 closes a circuit for the relays 420 and 421, respectively. The circuit for the relay 420 is completed from ground through the winding of relay 420, front contact and armature 482, armature 481, and its front contact, from contact and armature 429 and battery to ground. The circuit for the relay 421 is completed from ground through the winding of relay 421, the front contact and armature 429 and battery to ground. Other results of the energization of the relay 476 are that, at armature 484, the circuit of the tripping magnet 488 is opened and, at armature 483, a circuit is prepared for grounding the bank contact 590 at the code sending switch. The energizations of the relays 420 and 421 cause the finder switch F-1 to be operated to rotate the wipers 511 to 514, inclusive, in engagement with the bank contacts 515 to 518, inclusive.

The code sending switch CD-1 is then operated to send out a code which will be the same as before, inasmuch as the relay 422 is operated. There is a difference in this instance, however, for the reason that the relay 476 is operated. Because of this fact, there is a ground connection upon the bank contact 590, and, while the third series of impulses are being sent, the wipers 555 to 558, inclusive, of the code sending switch CD-1 will be rotated in engagement with the bank contact set which includes the bank contact 590.

Immediately upon this operation, a circuit is completed extending from ground by way of the wiper 514, the bank contact 518, the conductor 463, the armature 483 and its front contact, the conductor 467, the bank contact 590, the wiper 556, and through the winding of the relay 501 to battery. The energization of the relay 501 opens the circuit of the magnet 534 at armature 505, prepares another circuit for the said magnet at front contact of this armature, and at armature 506 opens the circuit of the slow-release relay 532.

By these operations, a pause occurs in the series of interruptions, as before described, the stepping of the code sending switch CD-1 and the sending of the code being resumed upon the deenergization of the slow-release relay 531 in the manner previously described. When this pause in the sending occurs, the wipers of the connector switch H-1 will be in a corresponding relative position to the wipers of the code sending switch, which, in this case, is the twenty-fourth set of bank contacts, and it will be assumed that the wipers 630 to 633, inclusive, at the connector H-1, are in engagement with this twenty-fourth bank contact set which includes the bank contact 684.

As previously described, upon the pause occurring, the slow-release relay 680, which has been maintained energized during the third movement of the connector switch wipers by the operation of the armature 620 of the line relay 607, is deenergized. As a result of this operation, a circuit is completed extending from battery by way of the wiper 631, the bank contact 684, the armature 681 and its back contact, the armature 683 and its front contact, the conductor 648, and through the winding of the relay 781 to ground. The relay 781, upon being energized, establishes a locking circuit for itself at the armature 786 over a circuit extending from battery by way of the front contact and the armature 689, the conductor 645, the armature 786 and its front contact, and through the winding of the relay 781 to ground. Another result of the energization of the relay 781 is that a certain circuit is prepared at armature 785, which will be described.

When the stepping of the code sending switch CD-1 is resumed, the interruptions in the line circuit occur as before and the wipers of the code sending switch CD-1 and the connector H-1 are stepped in unison to their twenty-fifth positions. At this point, another pause occurs in the interruptions and the slow-release relay 602 in the connector switch H-1 is allowed to deenergize.

The relay 602, upon being deenergized, closes a circuit at the armature 610 which extends from ground over the conductor 660 and the winding of the low resistance relay 782, the armature 726 and its front contact, the front contact and the armature 720, through the winding of the relay 700 and the resistor 704 to the negative pole of the battery. The relays 700 and 782 are energized over this circuit. The armatures 716 and 715 are so arranged that the former closes its circuit an instant ahead of armature 715. The operation of the relay 700 changes the supervisory lamp signals to indicate to the dispatcher that the circuit breaker C at the substation is closed by lighting the lamp 718.

The relay 782, upon energizing, completes a circuit which extends from the positive pole of the battery B, the back contact and the armature 694, the conductor 644, the front contact and the armature 785, the armature 788 and its front contact, the armature 726 and its front contact, the front contact and the armature 720, the armature 715 and its front contact, the conductor 185, through the winding of the relay 106, the conductor 183, the front contact and the armature 714 to ground. The relay 106 is energized over this circuit and, upon operating, establishes a locking circuit for itself extending from the positive pole of the battery B by way of the spring 176 and its resting contact, the armature 173 and its working contact, through the winding of the relay 106, the conductor 183, and thence to ground by way of the front contact and the armature 714.

The battery B has its negative pole grounded. The other batteries which have been mentioned all have their positive poles grounded. It will, of course, be understood that all these batteries may be two central batteries connected in the manner indicated.

It will be noted that the relay 700, upon energizing, establishes a locking circuit for itself extending from ground by way of the normally closed springs controlled by the armature 196, the conductor 186, the front contact and the armature 716, through the winding of the relay 700, and through the resistor 704 to battery. The energization of the relay 106, which follows the closure of the above traced circuit, operates the armature 196. As a result of this operation, the previously traced locking circuit for the relay 700 is opened. However, the relay 700 is maintained energized over a circuit extending from the positive pole of the battery B by way of the armature 196 of the relay 106 and its front contact, the conductor 186, the front contact and the armature 716, through the winding of the relay 700, and through the resistor 704 to battery. As this circuit is established before the above-mentioned locking circuit is opened, the relay 700 is maintained energized.

It will be seen that, as this circuit goes from the positive pole of the battery B to the negative pole of the other battery, these batteries are in series and, consequently, the relay 700 will be maintained energized. This statement holds true when a circuit is closed for the relay 106 by the operation of the relay 782, as previously described. The code sending switch CD-1 at the substation and the connector H-1 in the dispatcher's office are released in the usual manner after the sending of the code. Inasmuch as the relay 476 at the substation is locked energized, this code will be repeatedly sent out until the relay 476 is deenergized as will be explained later.

The energization of the relay 106 initiates the operation of the finder switch F and the code sending switch CD to send out the opening code for tripping the circuit breaker C. Inasmuch as the circuit breaker C has been tripped by the operation of the overload relay 475, the sending out of this code is merely to close the circuit for the relay 491 of the selecting relays whereby the relay 476 is denergized as will be explained later and the sending out of the code, indicating that the circuit breaker C is closed, is stopped. The operation of the code sending switch CD and the connector switch H occurs in the usual manner, the relays 302 and 306 being operated in the relay groups RG and RG-1 to select the tripping relay 491.

The relay 491, upon energizing, closes a circuit at the armature 494 for shunting the relay 476, and at armature 492 closes a circuit for the relays 420 and 421 the circuits for which have already been traced. The relay 476 deenergizes to open its locking circuit and to prepare a circuit for the contactor 490. Other results of the deenergization of the relay 476 are that the circuits of the relays 421, 422 and 423 are opened. The relay 422 is the only one that is deenergized, inasmuch as the relays 420 and 421 are maintained energized by the operation of the relay 491. The finder switch F-1 and the code sending switch CD-1 are now operated to generate a code of impulses which corresponds to the code signifying that the circuit breaker C is in open position.

At the dispatcher's office, in response to this code, the connector switch H-1 is operated to close a circuit for the relays 709 and 705 whereby the relay 700 is shunted. The relay 700 immediately deenergizes to change the supervisory lamp signals and to open the circuit of the relay 106. The deenergization of the relay 106 stops the sending out of the tripping code from the dispatcher's station.

By the change in supervisory signals, first to indicate that the breaker is closed, and then to indicate that the breaker is open, the dispatcher is apprised that the automatic control apparatus at the substation has attempted to close the circuit breaker and that the circuit breaker has been opened on overload.

It will be seen that line trouble or faulty operation of any of the switches, which prevents the closing code, when the circuit breaker C first operates, or the opening code from the dispatcher's station getting through, will not cause a failure in operation, because the codes will be repeatedly sent out until they perform the required operations.

It may sometimes occur that the dispatcher will desire to close the circuit breaker C at the substation when there is an overload condition present. Of course, he will not be aware of this condition. In this instance, the dispatcher will proceed as before described, and the circuit breaker relay 404 will be selected by the operation of the connector H through the intermediate action of the relay groups RG and RG–1. The operation of this relay closes a circuit for the relays 420 and 421 and also closes the circuit for the contactor 490. The energization of the contactor 490 closes a circuit for the closing coil 487 of the circuit breaker C. The circuit breaker C will now close. If there is a short-circuit condition present, the overload relay 475 will operate as before and close the circuit for the relay 476.

The relay 476 operates in the same manner as before to open the circuit of the contactor 490, thereby preventing any subsequent closure of the circuit breaker C while the code is being repeated from the dispatcher's office. In addition, the energization of the relay 476 sends back a signal which will change the supervisory lamps so as to indicate to the dispatcher that the circuit breaker has been closed. Furthermore, the operation of the lamp supervisory relay, in this instance, opens the circuit for sending out the code in the dispatcher's office. Another result of the operation of the lamp supervisory relay is that the relay 106 is energized, as before, to send out the tripping code of the breaker whereby the relay 476 is deenergized and a code is sent back to the dispatcher to inform him of the true positions of the circuit breaker. In this case, also, the supervisory lamps indicating first that the circuit breaker is closed and then that the circuit breaker is open, show the dispatcher that there is an overload condition present. In the above case, also, the circuits are so arranged that no faulty operation can occur, due to the codes not getting through or the apparatus not functioning properly.

My invention is not limited to the particular arrangement of the apparatus described but may be variously modified without departing from the spirit and scope thereof, as set forth in the appended claims.

I claim as my invention:

1. In an electrical control system, the combination with a control office, a substation, and apparatus units in said substation, of signalling devices at said office, code sending means at said substation, automatic apparatus at said substation for controlling said units, means responsive to a change in condition of one of said units for operating said code sending means, means responsive to said code sending means for operating said signalling devices, and means operative to repeat said sending operation in the event that said signalling devices are not conditioned for operation.

2. In a signalling system, a first station, a second station, a plurality of apparatus units at said second station, means for operating said apparatus units automatically, means for transmitting code combinations of impulses from said first to said second station, means at said second station responsive to said code combination of impulses for selectively operating one of said apparatus units, means whereby said code transmitting means is operated to repeatedly transmit said code of impulses until said unit has operated and means operative in the event said unit is operated by said automatic means for rendering said unit non-responsive to said code of impulses.

3. In a signalling system, a first station, a second station, a plurality of apparatus units at said second station, means for operating said apparatus units automatically, normally non-operating means for transmitting code combinations of impulses from said first to said second station, means at said second station responsive to said code combination of impulses for selectively operating one of said apparatus units, means whereby said code transmitting means is operative to repeatedly transmit said code of impulses until said unit has operated, means operative in the event said unit is operated by said automatic means for rendering said unit non-responsive to said code of impulses, and means for restoring said code transmitting means to a non-operating condition, without re-operating said unit.

4. In a signalling system, a first station, a second station, a plurality of apparatus units at said second station, means for operating said apparatus unit automatically, means for transmitting code combinations of impulses from said first to said second station, means at said second station responsive to said code combination of impulses for selectively operating one of said apparatus units, means whereby said code transmitting means is operative to repeatedly transmit said code of impulses until said unit has operated, means operative in the event said unit is operated by said automatic means for rendering said unit non-responsive to said code of impulses, signalling devices individual to each of said apparatus units, means responsive to each operation of said apparatus unit for transmitting code combinations of impulses to said first station and means at said first station responsive to code combinations of impulses for operating said signalling devices to indicate at all times the condition of said units, said signalling device changing as said unit changes to indicate the changed condition of said unit.

5. In a supervisory control system, a first station, a second station, apparatus units at said second station, means at said first station for transmitting code combinations of impulses from said first to said second station, means at said second station responsive to code combinations of impulses for operating a predetermined apparatus unit in accordance with the code transmitted, means for repeatedly operating said first mentioned code transmitting means to repeat said code transmission until said apparatus unit has been operated, means for automaticaly operating said apparatus unit and means responsive to the automatic operation of said apparatus unit for rendering said code transmitting means non-operative to repeat said code.

6. In a supervisory control system, a first station, a second station, apparatus units at said second station, means at said first station for transmitting code combinations of impulses from said first to said second station, means at said second station responsive to the code combinations of impulses for operating a predetermined apparatus unit in accordance with the code, means for repeatedly operating said first mentioned code transmitting means to repeat said code transmission until said apparatus unit has been operated, means for automatically operating said apparatus unit, and means for rendering said apparatus unit non-responsive to said code following its automatic operation of said unit.

7. In a supervisory control system, a first station, a second station, apparatus units at said second station, means at said first station for transmitting code combinations of impulses from said first to said second station, means at said second station responsive to the code combinations of impulses for operating a predetermined apparatus unit in accordance with the code, means for repeatedly operating said first mentioned code transmitting means to repeat said code transmission until said apparatus unit has been operated, means for automatically operating said apparatus unit, means for rendering said apparatus unit non-responsive to said code following its automatic operation, and means for rendering said code transmitting means non-operative to transmit said code.

8. In a supervisory control system, a first station, a second station, apparatus units at said second station, means at said first station for transmitting code combinations of impulses from said first to said second station, means at said second station responsive to the code combinations of impulses for operating a predetermined apparatus unit in accordance with the code transmitted, means for repeatedly operating said first mentioned code transmitting means to repeat said code transmission until said apparatus unit has been operated, means for automatically operating said apparatus unit, means for rendering said apparatus unit non-responsive to said code following its automatic operation, signalling devices individual to said apparatus units at said first station and means operated in response to the operation of said apparatus unit for operating said signalling device.

9. In a supervisory control system, a first station, a second station, a plurality of apparatus units at said second station, signalling devices individual thereto at said first station, means responsive to the operation of any one of said apparatus units for transmitting code combinations of impulses individual to said unit and its operated position, means at said first station responsive to said code combination of impulses for operating the associated signalling device, means for operating said apparatus unit automatically and means responsive to the automatic operation of said apparatus unit for transmitting a code different than the code transmitted in response to the operation of said unit to the same position by a manual operation from said first station.

10. In a signalling system, a first station, a second station, a plurality of apparatus units at said second station, an operating means individual to each of said apparatus units at said first station, a finder operable in a predetermined manner in response to the operation of any one of said operating means, a code transmitter controlled by the operation of said finder for transmitting a code individual to said operated means, means responsive to said code for operating an apparatus unit, and means operable at any time before the complete transmission of said code for preventing the operation of said last mentioned means.

11. In a signalling system, a first station, a second station, a plurality of apparatus units at said second station, an operating means individual to each of said apparatus units at said first station, a finder operable in response to the operation of any one of said operating means, a code transmitter controlled by the operation of said finder for transmitting a code individual to said operated means, means at said second station responsive to code combinations of impulses for operating one of said apparatus units and means operable at any time before the complete transmission of said code for preventing the operation of said apparatus unit.

In testimony whereof, I have hereunto subscribed my name this 14th day of September 1923.

JOHN E. GARDNER.